United States Patent
Hamada et al.

[19]

[11] Patent Number: 6,076,033
[45] Date of Patent: Jun. 13, 2000

[54] PROCESS FOR CONTROLLING YAW MOMENT IN VEHICLE

[75] Inventors: Tetsuro Hamada; Yoshihiro Kanamaru; Mitsuhiro Iwata; Naoki Hayashibe; Yoshikazu Konishi; Ryuichi Kawanaka, all of Wako, Japan

[73] Assignee: Honda Giken Kogyo Kabushiki Kaisha, Tokyo, Japan

[21] Appl. No.: 08/710,303

[22] Filed: Sep. 17, 1996

[30] Foreign Application Priority Data

Sep. 26, 1995 [JP] Japan ................................ 7-247336
Nov. 2, 1995 [JP] Japan ................................ 7-286206

[51] Int. Cl.$^7$ ........................................................ G06F 7/70
[52] U.S. Cl. ........................ 701/70; 701/72; 701/80; 701/82; 701/69; 180/197; 180/248
[58] Field of Search ............................ 701/70, 71, 72, 701/78, 80, 82, 83, 69; 180/197, 248

[56] References Cited

U.S. PATENT DOCUMENTS

| | | | |
|---|---|---|---|
| 4,973,296 | 11/1990 | Shibahata | 375/231 |
| 5,183,131 | 2/1993 | Naito | 180/233 |
| 5,259,476 | 11/1993 | Matsuno et al. | 180/197 |
| 5,328,255 | 7/1994 | Isella | 303/103 |
| 5,332,300 | 7/1994 | Hartmann et al. | 303/100 |
| 5,341,297 | 8/1994 | Zomotor et al. | 364/426.03 |
| 5,408,411 | 4/1995 | Nakamura et al. | 364/424 |
| 5,636,121 | 6/1997 | Tsuyama et al. | 364/426.01 |
| 5,711,025 | 1/1998 | Eckert et al. | 701/83 |
| 7,164,926 | 6/1995 | Nakayama et al. . | |

FOREIGN PATENT DOCUMENTS

| | | | |
|---|---|---|---|
| 39 00 638 A1 | 7/1989 | Germany . | |
| 1-111538 | 4/1989 | Japan | 180/197 |
| 5-139174 | 8/1993 | Japan | 180/197 |
| 7-164926 | 6/1995 | Japan . | |

*Primary Examiner*—William A. Cuchlinski, Jr.
*Assistant Examiner*—Arthur D. Donnolly
*Attorney, Agent, or Firm*—Armstrong, Westerman, Hattori, McLeland & Naughton

[57] ABSTRACT

A process for controlling a yaw moment in a vehicle by generating a braking force in one of the left and right wheels of the vehicle and by generating a driving force in the other wheel. When a vehicle is accelerated during the turning thereof, grounding loads of rear wheels are increased in order to generate a yaw moment in a direction opposite from a turning direction. However, such yaw moment can be eliminated in order to enhance the turning performance by bringing one of the hydraulic clutches into an engaged state with a torque which is proportional to a product of longitudinal and lateral accelerations. Consequently, a braking force and a driving force in inner and outer wheels during turning of the vehicle, respectively, are generated. When the vehicle is decelerated during turning thereof, grounding loads of front wheels are increased to a yaw moment in the same direction as the turning direction. However, such yaw moment can be eliminated in order to enhance the high-speed stable performance by bringing one of the hydraulic clutches into an engaged state with a torque which is proportional to longitudinal and lateral accelerations. Thus, when the vehicle is accelerated or decelerated during the turning thereof, the generation of an undesired yaw moment can be avoided in order to insure the turning performance and the high-speed stable performance.

5 Claims, 6 Drawing Sheets

PROCESS FOR CONTROLLING YAW MOMENT IN VEHICLE

BACKGROUND OF THE INVENTION

1. Field of the Invention

The present invention generally relates to a process for controlling a yaw moment in a vehicle by generating a braking force in either one of the left and right wheels and by generating a driving force in the other wheel.

2. Description of the Related Art

There is a torque distribution control system conventionally known from Japanese Patent Application Laid-open No. 5-131855, wherein left and right wheels of a vehicle are interconnected by a torque transmitting clutch; and the torque transmitting capacity of the torque transmitting clutch is controlled.

In such a torque distribution control system, if a torque is transmitted from the inner wheel to the outer wheel during the turning of the vehicle, a driving force can be generated in the outer wheel and a braking force can be generated in the inner wheel to enhance the turning performance. If a torque is transmitted from the outer wheel to the inner wheel during the turning of the vehicle, a braking force can be generated in the outer wheel and a driving force can be generated in the inner wheel in order to enhance the high-speed stable performance.

However, the above-discussed conventional system has a problem in that when the vehicle is accelerated or decelerated during the turning thereof, the grounding loads of the front and rear wheels are varied by longitudinal inertial force applied to the position of a center of gravity of the vehicle and hence, a rotational moment (yaw moment) about a yaw axis is generated in order to influence the turning performance and the high-speed stable performance of the vehicle.

SUMMARY OF THE INVENTION

Accordingly, it is an object of the present invention to avoid the generation of an undesired yaw moment in order to ensure the turning performance and the high-speed stable performance when the vehicle is accelerated or decelerated during the turning thereof.

In order to achieve the above object, according to a first aspect and features of the present invention, there is provided a process for controlling a yaw moment in a vehicle by generating a braking force in either one of the left and right wheels and by generating a driving force in the other wheel, wherein values of the driving force and the braking force are set as functions of a product of a longitudinal acceleration and a lateral acceleration.

With such structural arrangement, when the vehicle is accelerated during the turning thereof, the number of rotations of the inner wheel during the turning of the vehicle is decreased in order to generate a braking force, while the number of rotations of the outer wheel is increased in order to generate a driving force, whereby a moment generated in a direction opposite from a turning direction based on a cornering force can be eliminated so as to enhance the turning performance. When the vehicle is decelerated during the turning thereof, the number of rotations of the inner wheel is increased so as to generate a driving force, while the number of rotations of the outer wheel is decreased so as to generate a braking force, whereby a moment generated in the same direction as the turning direction based on a cornering force can be eliminated in order to enhance the high-speed stable performance.

According to a second aspect and feature of the present invention, in addition to the first feature, the braking force is generated in either one of the left and right follower wheels having a grounding load smaller than that of the driven wheels, while the driving force is generated in the other follower wheel. When no longitudinal acceleration of the vehicle is generated, the values of the driving force and braking force are increased in accordance with an increase in lateral acceleration of the vehicle.

With the above structural arrangement, the cornering force of the driven wheels lying at near a limit point can be decreased because of its large grounding load. Thus, the cornering force of the driven wheel can be provided with a margin, and the turning of the vehicle with a further large lateral acceleration can be performed with the use of such a margin; thereby contributing to an enhancement in turning performance of the vehicle which is being turned in a steady state. Moreover, the difference between slip angles of the driven and follower wheels can be decreased; thereby causing the steering characteristic to approach a neutral steering.

According to a third aspect and feature of the present invention, in addition to the first feature, the braking force is generated in either one of the left and right wheels and the driving force is generated in the other wheel by connecting the left and right wheels through a gear box so as to generate differential rotations.

With the above structural arrangement, the braking force and the driving force can be reliably generated in the left and right wheels, respectively.

The above and other objects, features and advantages of the invention will become apparent from the following description of a preferred embodiment taken in conjunction with the accompanying drawings.

DETAILED DESCRIPTION OF THE PREFERRED EMBODIMENTS

Figure 1:
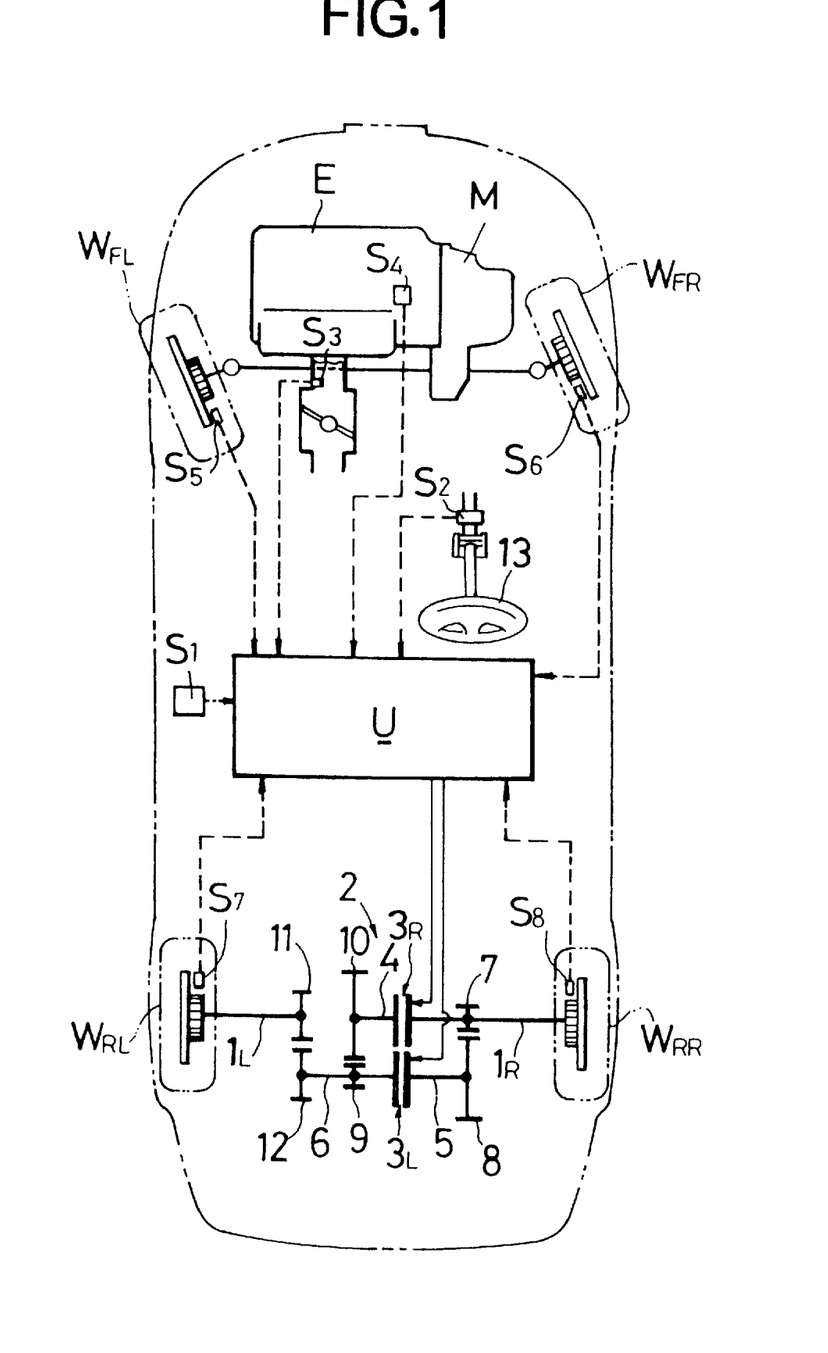
FIG. 1 is a diagrammatic illustration of the entire structural arrangement of a front engine and front drive vehicle equipped with a torque distribution control system.

In reference to FIG. 1, a transmission M is connected to a right end of an engine E mounted laterally at a front portion of a vehicle body, and a left front wheel $W_{FL}$ and a right front wheel $W_{FR}$ as driven wheels are driven by the engine E and the transmission M.

A gear box 2 is mounted between axles $1_L$ and $1_R$ for left and right rear wheels $W_{RL}$ and $W_{RR}$ as follower wheels for connecting the left and right rear wheels $W_{RL}$ and $W_{RR}$ so that the left and right rear wheels $W_{RL}$ and $W_{RR}$ are rotated at different numbers of rotations from each other. The gear box 2 is provided with a first hydraulic clutch $3_L$ and a second hydraulic clutch $3_R$. When the first hydraulic clutch $3_L$ is brought into an engaged state, the number of rotations of the left rear wheel $W_{RL}$ is decreased, while the number of rotations of the right rear wheel $W_{RR}$ is increased. When the second hydraulic clutch $3_R$ is brought into an engaged state, the number of rotations of the right rear wheel $W_{RR}$ is decreased, while the number of rotations of the left rear wheel $W_{RL}$ is increased.

The gear box 2 includes a first shaft 4 disposed coaxially with the left and right axles $1_L$ and $1_R$, and a second shaft 5 and a third shaft 6 which are disposed coaxially with each other and parallel to the left and right axles $1_L$ and $1_R$. The first hydraulic clutch $3_L$ is disposed between the second and third shafts 5 and 6, and the second hydraulic clutch $3_R$ is disposed between the right axle $1_R$ and the first shaft 4. A first smaller-diameter gear 7 is provided on the right axle $1_R$ and meshed with a second larger-diameter gear 8 which is provided on the second shaft 5. A third smaller-diameter gear 9 is provided on the third shaft 6 and meshed with a fourth larger-diameter gear 10 which is provided on the first shaft 4. A fifth gear 11 is provided on the left axle $1_L$ and meshed with a sixth gear 12 which is provided on the third shaft 6.

The numbers of teeth of the first and third gears 7 and 9 are set at the same value, and the numbers of teeth of the second and fourth gears 8 and 10 are set at the same value and larger than the numbers of teeth of the first and third gears 7 and 9. The numbers of teeth of the fifth and sixth gears 11 and 12 are set at the same value.

Therefore, when the first hydraulic clutch $3_L$ is brought into its engaged state, the right rear wheel $W_{RR}$ is connected to the left rear wheel $W_{RL}$ through the right axle $1_R$, the first gear 7, the second gear 8, the second shaft 5, the first hydraulic clutch $3_L$, the third shaft 6, the sixth gear 12, the fifth gear 11 and the left axle $1_L$. Consequently, the number of rotations of the left rear wheel $W_{RL}$ is decreased relative to the number of rotations of the right rear wheel $W_{RR}$ in accordance with a ratio of the number of teeth of the first gear 7 to the number of teeth of the second gear 8. Thus, when the first hydraulic clutch $3_L$ is brought into engagement from a state in which the left and right rear wheels $W_{RL}$ and $W_{RR}$ are rotated at the same speed, the number of rotations of the right rear wheel $W_{RR}$ is increased, and the number of rotations of the left rear wheel $W_{RL}$ is decreased.

When the second hydraulic clutch $3_R$ is brought into engagement, the right rear wheel $W_{RR}$ is connected to the left rear wheel $W_{RL}$ through the right axle $1_R$, the second hydraulic clutch $3_R$, the first shaft 4, the fourth gear 10, the third gear 9, the third shaft 6, the sixth gear 12, the fifth gear 11 and the left axle $1_L$. Consequently, the number of rotations of the left rear wheel $W_{RL}$ is increased relative to the number of rotations of the right rear wheel $W_{RR}$ in accordance with a ratio of the number of teeth of the fourth gear 10 to the number of teeth of the third gear 9. Thus, when the second hydraulic clutch $3_R$ is brought into engagement from a state in which the left and right rear wheels $W_{RL}$ and $W_{RR}$ are rotated at the same speed, the number of rotations of the right rear wheel $W_{RR}$ is decreased, and the number of rotations of the left rear wheel $W_{RL}$ is increased.

The engagement forces of the first and second hydraulic clutches $3_L$ and $3_R$ can be continuously controlled by adjusting the magnitudes of hydraulic pressures applied to the first and second hydraulic clutches $3_L$ and $3_R$. Therefore, the ratio of the number of rotations of the left rear wheel $W_{RL}$ to the number of rotations of the right rear wheel $W_{RR}$ can also be continuously controlled within a range determined by a ratio of teeth of the first to fourth gears 7, 8, 9 and 10.

The following signals are inputted to an electronic control unit U to which the first and second hydraulic clutches $3_L$ and $3_R$ are connected: a signal from a lateral acceleration sensor $S_1$ for detecting a lateral acceleration of the vehicle body; a signal from a steering angle sensor $S_2$ for detecting a rotational angle of a steering wheel 13; a signal from an intake pipe internal absolute pressure sensor $S_3$ for detecting an internal absolute pressure in an intake pipe of the engine E; a signal from an engine revolution-number sensor $S_4$ for detecting a number of revolutions of the engine E; and signals from wheel speed sensors $S_5$, $S_6$, $S_7$ and $S_8$ for detecting numbers of rotations of the four wheels to calculate a vehicle speed.

The electronic control unit U corrects an actual lateral acceleration of the vehicle body detected by the lateral acceleration sensor $S_1$ based on an estimated lateral acceleration calculated from the rotational angle of the steering wheel 13 detected by the steering angle sensor $S_2$ and the wheel speeds detected by the wheel speed sensors $S_5$, $S_6$, $S_7$ and $S_8$. Consequently, a lateral acceleration Yg of the vehicle is calculated by the control unit U with no time lag. The electronic control unit U also multiplies an engine torque calculated from outputs from the intake pipe internal absolute pressure sensor $S_3$ and the engine revolution-number sensor $S_4$ by a transmission gear ratio to calculate a driven wheel torque, and calculates a longitudinal acceleration Xg of the vehicle based on the driven wheel torque. Further, the electronic control unit U controls the engagement forces of the first and second hydraulic clutches $3_L$ and $3_R$ based on the lateral and longitudinal accelerations Yg and Xg.

The operation of the embodiment of the present invention having the above-described construction will be described below.

Figure 2:
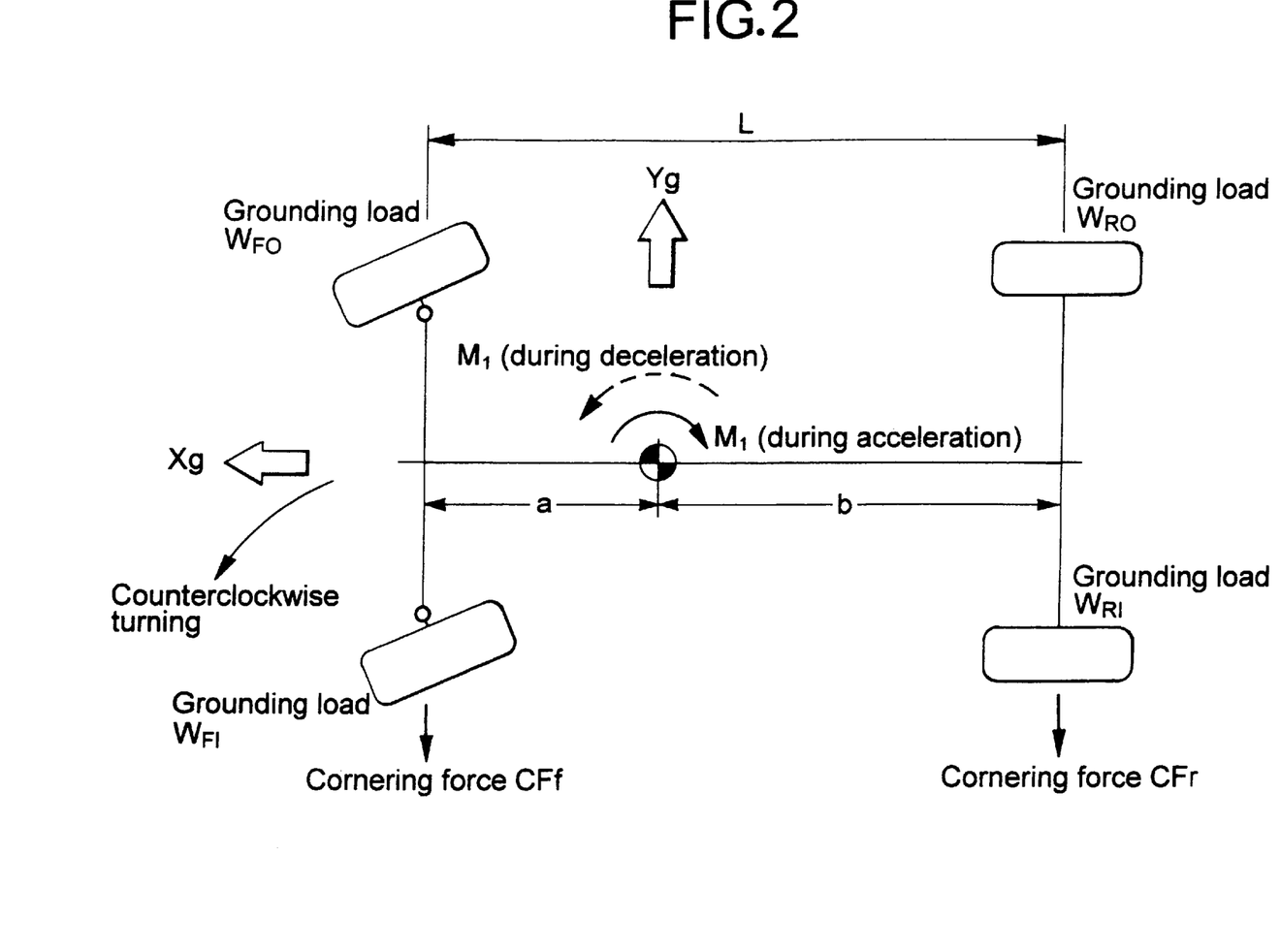
FIG. 2 is an illustration for explaining a yaw moment generated in the vehicle during the turning of the vehicle.

FIG. 2 shows a state in which a vehicle having a weight W is being turned counterclockwise at a lateral acceleration Yg. In this case, a centrifugal force W×Yg is applied at the position of a center of gravity of the vehicle, and balanced with a sum of a cornering force CFf applied between the front wheel and a road surface, and a cornering force CFr applied between the rear wheel and the road surface. In such a case, the following equation applies:

$$W \times Yg = CFf + CFr \quad (1).$$

If a distance between the position of the center of gravity of the vehicle and the front wheel is represented by a, and a distance between the position of the center of gravity of the vehicle and the rear wheel is represented by b, a moment $M_1$ provided about a yaw axis by the cornering forces CFf and CFr is given according to the following equation:

$$M_1 = a \times CFf - b \times CFr \quad (2).$$

When the vehicle is driven to travel straight ahead, the grounding loads of the left and right wheels are equal to each other, but when the vehicle is turned, the grounding load is varied between the inner and outer wheels as viewed during turning of the vehicle. That is, during the turning of the vehicle, a centrifugal force directed outwards in a turning direction is applied to the center of gravity of the vehicle body and hence, the vehicle body tends to fall down outwards in the turning direction. As a result, a tendency for the inner wheel during turning of the vehicle to float from the road surface is generated so as to decrease the grounding load of the inner wheel, and a tendency for the outer wheel during turning of the vehicle to be urged against the road surface is generated so as to increase the grounding load of the outer wheel.

When the vehicle is traveling at a constant speed, the grounding loads of the front and rear wheels are constant, but when the vehicle is accelerated or decelerated, the grounding loads of the front and rear wheels are varied. That is, during the acceleration of the vehicle, an inertial force directed rearwards of the vehicle body is applied to the center of gravity of the vehicle body and hence, the vehicle body is brought into a tail-dive state, thereby increasing the grounding load of the rear wheel and as a result, the cornering force of the rear wheel is increased to apply a moment $M_1$ opposite from the turning direction. During deceleration of the vehicle, an inertial force directed forwards of the vehicle body is applied to the center of gravity of the vehicle body and hence, the vehicle body is brought into a nose-dive state, thereby increasing the grounding load of the front wheel and as a result, the cornering force of the front wheel is increased to apply a moment in the same direction as the turning direction (see the solid line arrow and the dashed line arrow in FIG. 2).

When the vehicle is traveling straight ahead at a constant speed and if a sum of the grounding loads of the left and right front wheels is represented by Wf, the grounding load of each front wheel is Wf/2. When the vehicle is being accelerated or decelerated at a longitudinal acceleration Xg while being turned at a lateral acceleration Yg, the grounding load $W_{FI}$ of the front wheel (which is inner during turning of the vehicle) and the grounding load $W_{FO}$ of the front wheel (which is outer during turning of the vehicle) are given according to the following equations:

$$W_{FI}=Wf/2-Kf\times Yg-Kh\times Xg \qquad (3);$$

and $$W_{FO}=Wf/2+Kf\times Yg-Kh\times Xg \qquad (4).$$

If a sum of the grounding loads of the left and right rear wheels is represented by Wr, the load $W_{RI}$ of the rear wheel (which is inner during turning of the vehicle) and the grounding load $W_{RO}$ of the rear wheel (which is outer during turning of the vehicle) are given according to the following equations:

$$W_{RI}=Wr/2-Kr\times Yg+Kh\times Xg \qquad (5);$$

and $$W_{RO}=Wf/2+Kr\times Yg+Kh\times Xg \qquad (6).$$

In the equations (3) to (6), above, factors Kf, Kr and Kh are further defined according to the following equations:

$$Kf=(Gf'\times hg'\times W+hf\times Wf)/tf \qquad (7);$$

$$Kr=(Gr'\times hg'\times W+hr\times Wr)/tr \qquad (8);$$

and $$Kh=hg\times W/(2\times L) \qquad (9),$$

wherein the characters used in the above equations are further defined as follows:

Gf, Gr: Roll rigidity of front and rear wheels;
Gf', Gr': Distribution of roll rigidity of front and rear wheels;
Gf'=Gf/(Gf+Gr);
Gr'=Gr/(Gf+Gr);
hf, hr: Height of roll center of front and rear wheels;
hg: Height of center of gravity;
hg': Distance between center of gravity and roll shaft;
hg'=hg−(hf×Wf+hr×Wr)/W;
tf, tr: Tread of front and rear wheels;
L: Wheel base
L=a+b.

If the cornering force of a tire is proportional to the grounding load of such tire, the cornering force CFf of the front wheel is given according to the following equation (10) from: the grounding load $W_{FI}$ of the front wheel which is inner during turning of the vehicle, given by the equation (3); the grounding load $W_{FO}$ of the front wheel which is outer during the turning of the vehicle, given by the equation (4); and the lateral acceleration Yg:

$$CFf=W_{FI}\times Yg+W_{FO}\times Yg=Wf\times Yg-2\times kh\times Xg\times Yg \qquad (10).$$

The cornering force CFr of the rear wheel is given according to the following equation (11) from: the grounding load $W_{RI}$ of the rear wheel inner during turning of the vehicle, which is given by the equation (5); the grounding load $W_{RO}$ of the rear wheel outer during turning of the vehicle, which is given by the equation (6); and the lateral acceleration Yg:

$$CFr=W_{RI}\times Yg+W_{RO}\times Yg=Wr\times Yg+2\times kh\times Xg\times Yg \qquad (11).$$

If the equations (10) and (11) are replaced into the equation (2), the following equation (12) is provided:

$$M_1=a\times(Wf\times Yg-2\times Kh\times Xg\times Yg)-b\times(Wr\times Yg+2\times Kh\times Xg\times Yg)=(a\times Wf-b\times Wr)\times Yg-2\times Kh\times L\times Xg\times Yg \qquad (12),$$

wherein a×Wf−b×Wr=0, and Kh=hg×W/(2×L) from the equation (9). Therefore, the equation (12) results in the following:

$$M_1=-hg\times W\times Xg\times Yg \qquad (13);$$

and it can be seen that the moment $M_1$ about the yaw axis is proportional to the product of the longitudinal and lateral accelerations Xg and Yg. Thus, if the driving force and the braking force are distributed to the inner and outer wheels as viewed during turning of the vehicle so as to eliminate the moment $M_1$ about the yaw axis given by the equation (13), it is possible to enhance the turning stable performance and the high-speed stable performance at the time when the vehicle is accelerated or decelerated during the turning thereof.

Figure 3:
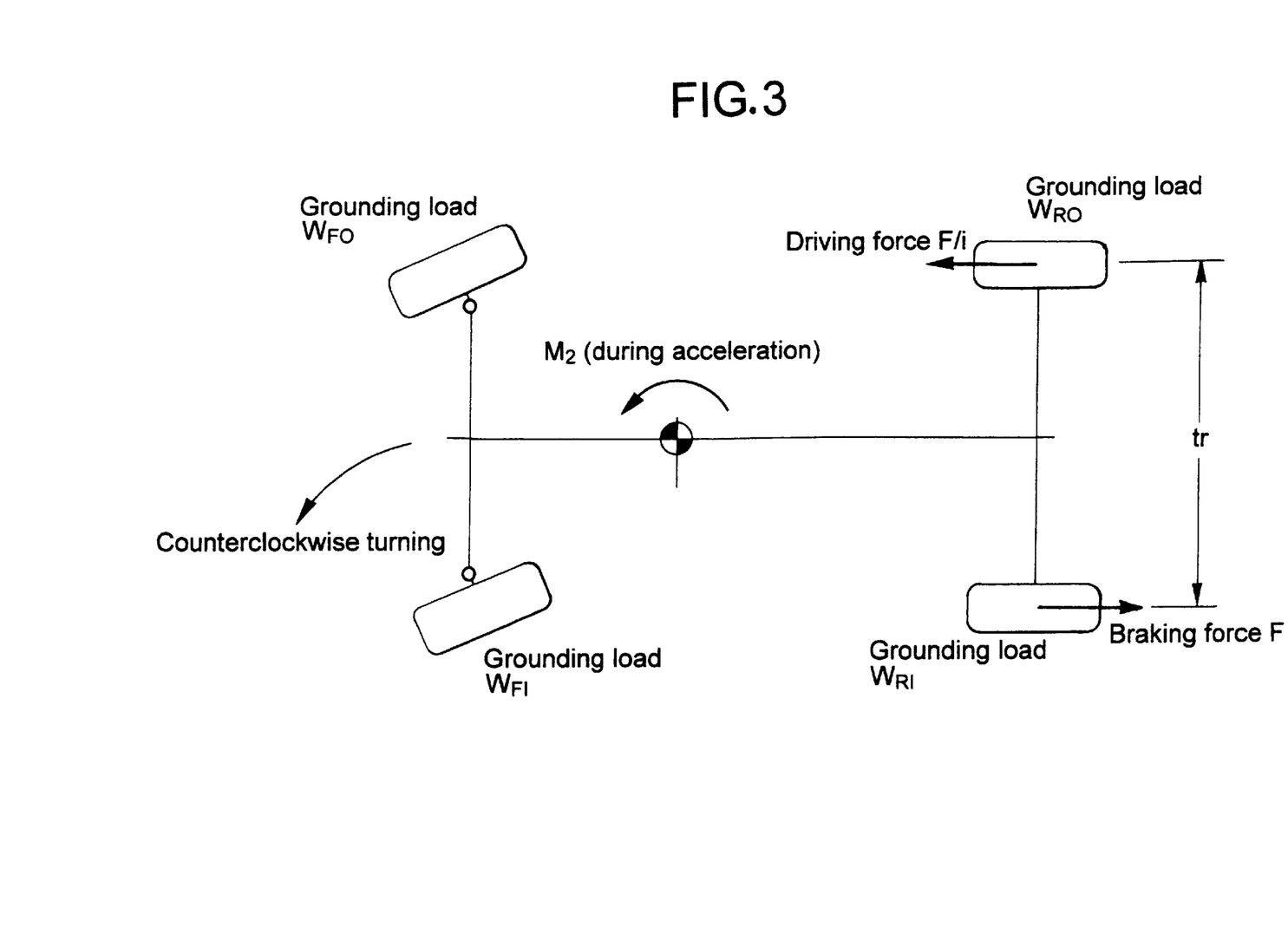
FIG. 3 is an illustration for explaining a yaw moment generated in the vehicle upon the engagement of a hydraulic clutch.

On the other hand, when the braking force F is generated, for example, in the inner wheel as viewed during the turning of the vehicle, as shown in FIG. 3, a driving force F/i (if the gear ratio of the gear box 2 is represented by i) is generated. A moment $M_2$ about the yaw axis generated in the vehicle by the braking force F and the driving force F/i is given according to the following equation:

$$M_2=(tr/2)\times F\times\kappa=(tr/2)\times(T/R)\times\kappa \qquad (14),$$

wherein κ=1+(1/i), T is a clutch torque, and R is a tire radius.

Therefore, a clutch torque T required to eliminate the moment $M_1$ by the moment $M_2$ is given according to the following equation by establishing that $M_1 = M_2$:

$$T=\{2R/(tr\times\kappa)\}\times hg\times W\times Xg\times Yg \qquad (15).$$

From the equation (15), the clutch torque T is a value proportional to the product of the longitudinal and lateral accelerations Xg and Yg. In the above discussions, it has been presumed that the cornering force of the tire is proportional to the load grounding of the tire. Therefore, the clutch torque T is the value proportional to the product $Xg \times Yg$ of the longitudinal and lateral accelerations Xg and Yg, but to be exact, the cornering force is not proportional to the grounding load. It is, in practice, preferable instead that the clutch torque T is used as a function of the product $Xg \times Yg$ of the longitudinal and lateral accelerations Xg and Yg.

As shown in Table 1, if the first hydraulic clutch $3_L$ is brought into its engaged state with the clutch torque given by the equation (15) when the vehicle is accelerated during turning in the counterclockwise direction, the number of rotations of the inner wheel (as viewed during turning of the vehicle) is decreased in order to generate the braking force F. The number of rotations of the outer wheel is increased so as to generate the driving force F/i, whereby the moment $M_1$ in the direction opposite from the turning direction based on the cornering force is eliminated, leading to an enhanced turning performance. Likewise, if the second hydraulic clutch $3_R$ is brought into its engaged state with the clutch torque T during turning of the vehicle in the clockwise direction, the moment $M_1$ based on the cornering force is likewise eliminated, leading to an enhanced turning performance.

If the second hydraulic clutch $3_R$ is brought into its engaged state with the clutch torque given by the equation (15) when the vehicle is decelerated during turning thereof, the number of rotations of the inner wheel is increased in order to generate the driving force F/i, and the number of rotations of the outer wheel is decreased in order to generate the braking force, whereby the moment $M_1$ in the same direction as the turning direction based on the cornering force is eliminated, leading to an enhanced high-speed stable performance. Likewise, if the first hydraulic clutch $3_L$ is brought into its engaged state when the vehicle is decelerated during turning thereof, the moment $M_1$ based on the cornering force is likewise eliminated, leading to an enhanced high-speed stable performance.

TABLE 1

| | Counterclock-wise turning | Clockwise turning | Effect |
|---|---|---|---|
| During acceleration | first clutch $3_L$ is turned ON | second clutch $3_R$ is turned ON | Enhancement in turning performance |
| During deceleration | second clutch $3_R$ is turned ON | first clutch $3_L$ is turned ON | Enhancement in high-speed stable performance |

Even if the vehicle is accelerated or decelerated during straight traveling thereof, the yaw moment of the vehicle is not varied and hence, the first and second hydraulic clutches $3_L$ and $3_R$ are maintained in their non-engaged states.

As described above, the magnitude of the moment generated, when the vehicle is accelerated or decelerated during turning thereof, is the value proportional to the product $Xg \times Yg$ of the longitudinal and lateral acceleration Xg and Yg. However, the longitudinal acceleration Xg is not produced in the vehicle which is being turned in a steady state without being accelerated or decelerated, and hence, the above-described moment is also not generated. Therefore, during turning of the vehicle in a steady state, the first and second hydraulic clutches $3_L$ and $3_R$ are maintained in their non-engaged states. However, even during steady-state turning of the vehicle, the first and second hydraulic clutches $3_L$ and $3_R$ can be brought into their engaged states to positively distribute the torque to the left and right rear wheels $W_{RL}$ and $W_{RR}$ in order to generate the moment, thereby increasing the limit lateral acceleration Yg of the vehicle so as to enhance the turning performance.

Figure 4:
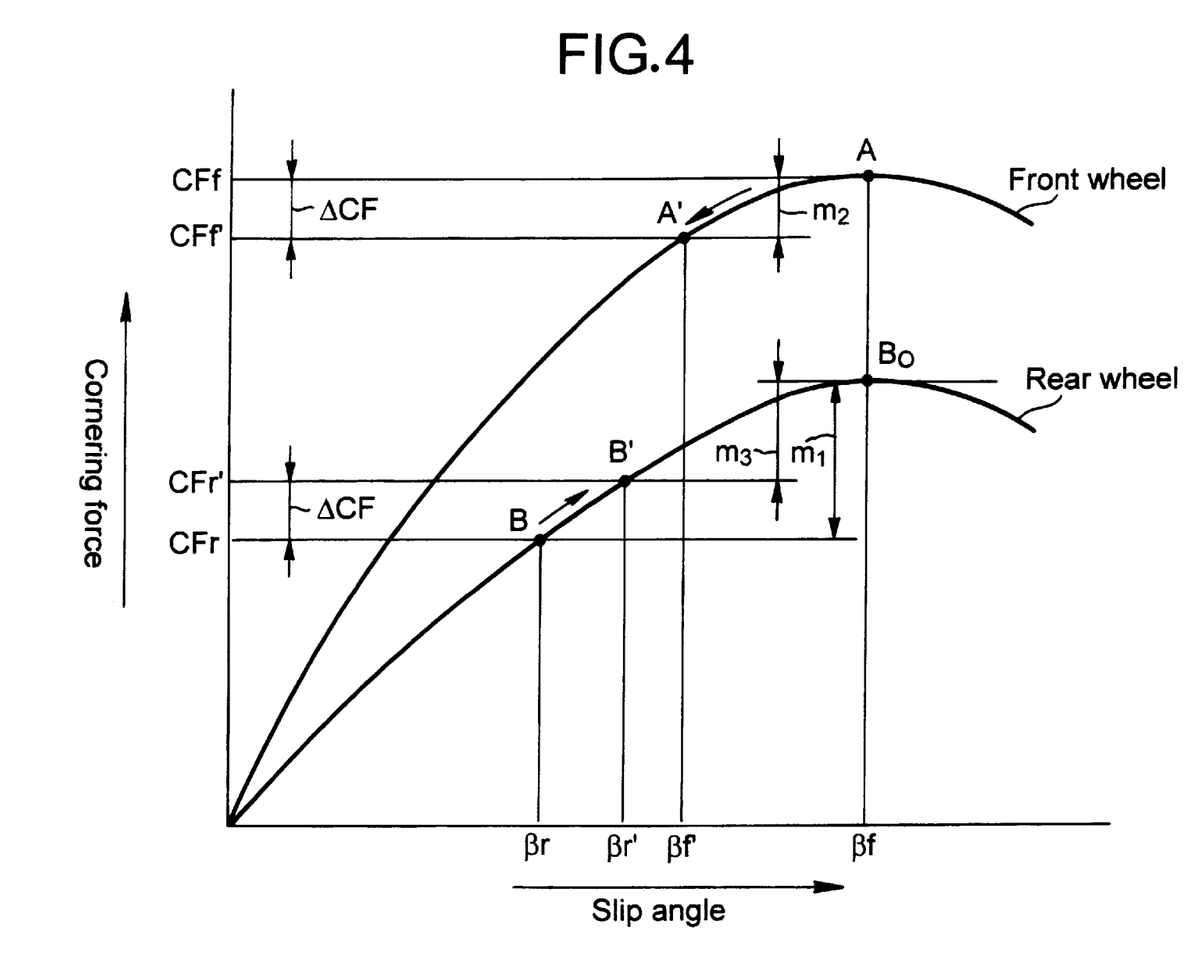
FIG. 4 is a graph illustrating the relationship between the slip angle and the cornering force.

FIG. 4 shows the relationship of the cornering force CFf relative to the slip angle βf of the front wheel and the relationship of the cornering force CFr relative to the slip angle βr of the rear wheel. As the slip angles βf and βr are increased from zero, the magnitudes of the cornering forces CFf and CFr are increased from zero. Then, when the slip angles βf and βr reach their limit points, the magnitudes of the cornering forces CFf and CFr are started so as to be decreased. The cornering force CFf of the front wheel located at a position nearer to the engine and having a larger grounding load is larger than the cornering force of the rear wheel located at a position further away from the engine E and having a smaller grounding load.

The values of the cornering forces CFf and CFr generated by the front and rear wheels during the turning of the vehicle depend on the value of the lateral acceleration Yg and is varied while maintaining the relationship of the equation (1). When the lateral acceleration Yg is increased, both of the slip angles βf and βr are increased and with this increase, both of the cornering forces CFf and CFr of the front and rear wheels are also increased. When the slip angle βf and the cornering force CFf of the front wheel reach a point A in FIG. 4 (i.e., the cornering force CFf of the front wheel reaching a limit point at which it cannot be increased), the current lateral acceleration Yg is the limit lateral acceleration Yg of the vehicle. As such, the slip angle βr and the cornering force CFr of the rear wheel are at a point B in FIG. 4 and hence, the cornering force of the rear wheel has a margin $m_1$ still remaining.

If the slip angle Of and the cornering force CFf of the front wheel can be set at the point A and the slip angle βr and the cornering force CFr of the rear wheel can be set at a point $B_0$ in FIG. 4, the cornering forces CFf and CFr of the front and rear wheels can be utilized at a maximum in order to increase the limit lateral acceleration Yg. However, such case is impossible because the ratio of the cornering forces CFf and CFr generated by the front and rear wheels depend on the equation (1), as described above.

However, the ratio of the cornering forces CFf and CFr generated by the front and rear wheels can be controlled to any value by distributing the torque to the inner and outer wheels during the turning of the vehicle, and such cornering forces CFf and CFr can be utilized without waste so as to increase the limit lateral acceleration Yg.

If a yaw moment $M_3$ is generated in the turning direction by providing a braking force to the inner wheel and a driving force to the outer wheel during steady-state turning of the vehicle, the above-described equation (2) is as follows:

$$M_1 = a \times CFf - b \times CFr + M_3 \tag{16}$$

From the equations (16) and (1), the cornering forces CFf of the front wheel and the cornering force CFr of the rear wheel are given according to the following equations:

$$CFf = \{b/(a+b)\} \times W \times Yg - M_3/(a+b) \tag{17}$$

and $$CFr = \{a/(a+b)\} \times W \times Yg + M_3/(a+b) \tag{18}$$

The equations (17) and (18) indicate that if the first and second hydraulic clutches $3_L$ and $3_R$ are brought into their engaged states during a steady-state turning of the vehicle to generate the moment $M_3$, the ratio of the cornering forces CFf and CFr of the front and rear wheels can be controlled to any value by the second term±$M_3/(a+b)$ in the right sides of the equations.

As can be seen from FIG. 4, when the vehicle is being turned in the steady state at the limit lateral acceleration Yg (namely, when the cornering force CFf of the front wheel lies at the point A, and the cornering force CFr of the rear wheel lies at the point B), the cornering force CFf of the front wheel is decreased by ΔCF [ΔCF=$M_3/(a+b)$] in order to provide CFf' (at a point A'), and the cornering force CFr of the rear wheel is increased by ΔCF [ΔCF=$M_3/(a+b)$] to provide CFr' (at a point B'), according to the above equations (17) and (18). As a result, a margin $m_2$ is newly generated in the cornering force CFf of the front wheel, and the margin $m_2$ still remains in the cornering force CFr of the rear wheel. The speed of the vehicle can be increased or the turning radius of the vehicle can be decreased by the margin $m_2$, thereby increasing the limit lateral acceleration Yg.

Figure 5:
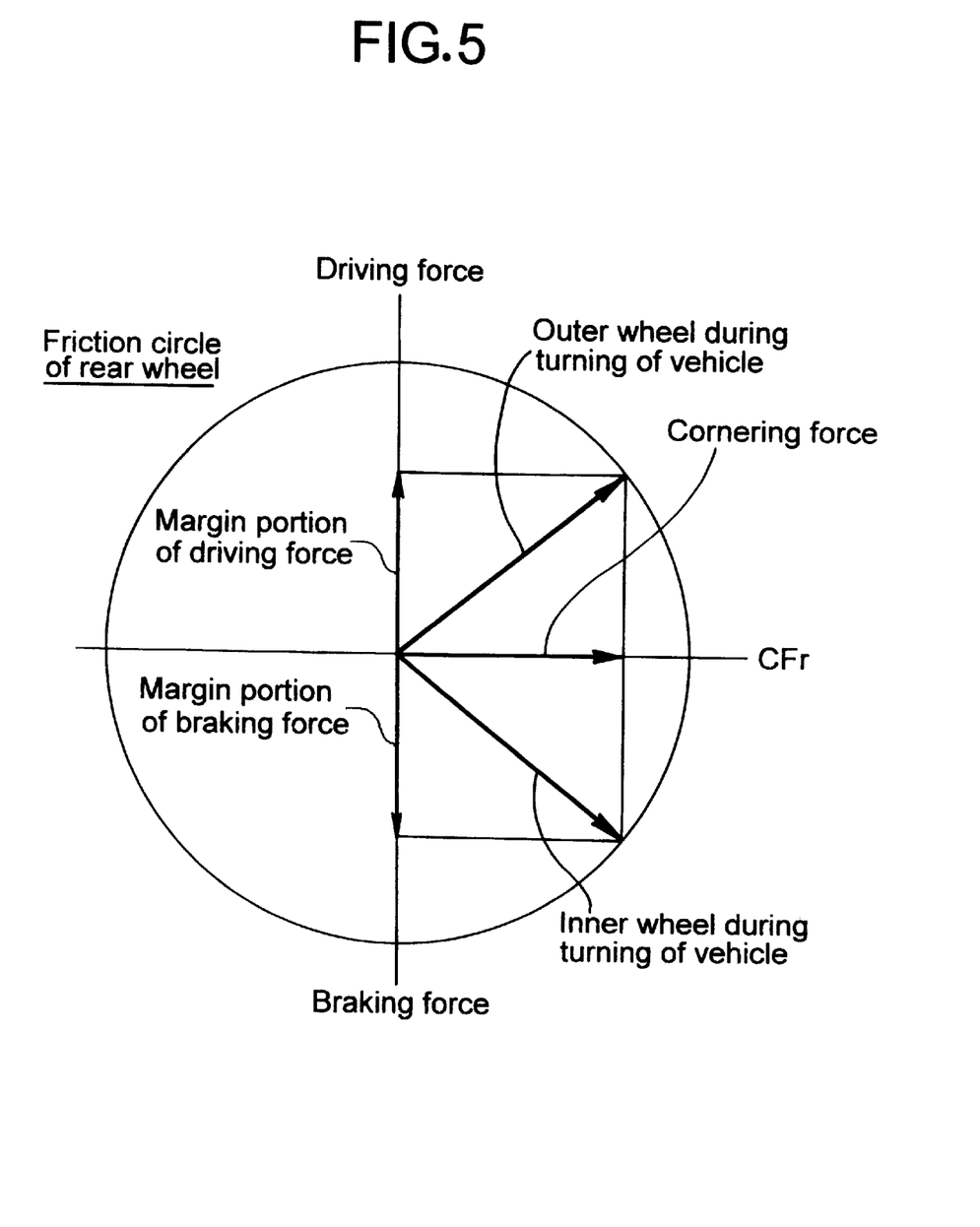
FIG. 5 is an illustration of a friction circle of a rear wheel.

FIG. 5 shows a friction circle of the rear wheel corresponding to the point B in FIG. 4. The outer wheel during turning of the vehicle and having a governing influence on the turning performance will now be considered. The load of ground of the outer wheel is increased in accordance with an increase in lateral acceleration Yg and hence, the margin portion of the driving force is also increased in accordance with the increase in the lateral acceleration Yg. Therefore, if the first and second hydraulic clutches $3_L$ and $3_R$ are increased in accordance with the increase in lateral acceleration Yg, the maximum cornering force CFf or CFr can be generated for the outer wheel in order to enhance the turning performance.

In this manner, the driving force and the braking force are generated in the rear wheels $W_{RL}$ and $W_{RR}$ in accordance with the lateral acceleration and hence, even during a steady-state turning of the vehicle with the longitudinal acceleration Xg of zero, such driving and braking forces can be generated in order to enhance the turning performance.

Figure 6:
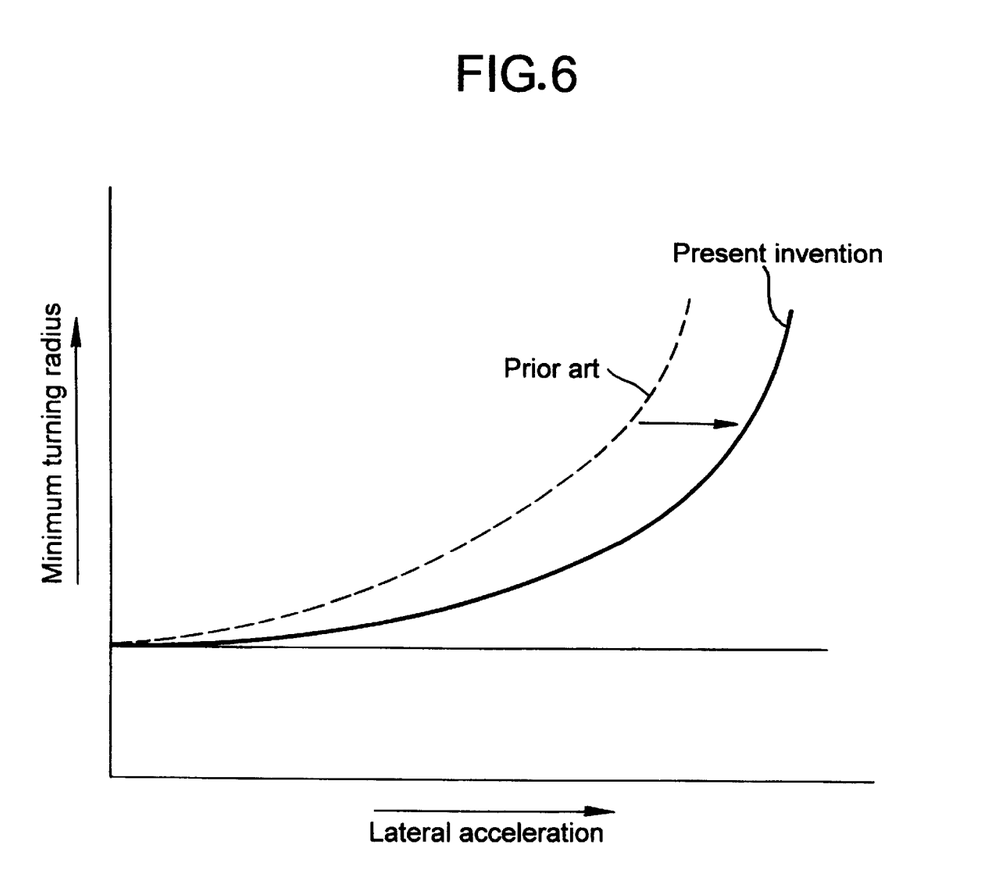
FIG. 6 is a graph illustrating the relationship between the lateral acceleration and the minimum turning radius.

FIG. 6 shows the relationship between the lateral acceleration and the minimum turning radius, wherein a dashed line indicates the minimum turning radius of the vehicle when the yaw moment $M_3$ has not been a control process, and a solid line indicates the minimum turning radius of the vehicle when the yaw moment $M_3$ has been applied in the control process according to the present invention. As shown in FIG. 6, in the control process according to the present invention, when the lateral acceleration Yg is constant, the minimum turning radius is decreased, and when the minimum turning radius is constant, the lateral acceleration (i.e., the vehicle speed) is increased, thereby enhancing the turning performance.

Further, as shown in FIG. 4, the slip angle βf of the front wheel is decreased to βf' and the slip angle βr of the rear wheel is increased to βr' by applying the yaw moment $M_3$. Hence, the difference between the slip angles βf' and βr' of the front and rear wheels can be decreased in such a way as to approach a neutral steering angle.

Although the embodiment of the present invention has been described in detail, it will be understood that the present invention is not limited to the above-described embodiment, and various modifications may be made without departing from the subject matter and scope of the invention defined in the claims.

For example, the distribution of the torque to the left and right rear wheels $W_{RL}$ and $W_{RR}$, which are follower wheels, has been described in the embodiment. However, the present invention is applicable not only to the distribution of the torque to the driving wheels, but also to the distribution of the torque to follower wheels in a vehicle in which an auxiliary driving source (such as, an electric motor) is connected to the follower wheels so that upon slipping of driving wheels, the auxiliary driving source is operated so as to provide a four-wheel drive state. Further, in place of the first and second hydraulic clutches $3_L$ and $3_R$, another clutch (such as, an electromagnetic clutch, a fluid coupling or the like) can be employed.

What is claimed is:

1. A process for controlling a yaw moment in a vehicle having left and right wheels, comprising the steps of:

generating a braking force in one of the left and right wheels; and generating a driving force in another of the left and right wheels in which no braking force is generated, wherein values of said driving force and said braking force are set based on a product between a longitudinal acceleration and a lateral acceleration, respectively.

2. The process for controlling a yaw moment in a vehicle according to claim 1, wherein the step of generating the braking force comprises the step of generating the braking force in one of left and right follower wheels having a grounding load smaller than that of driven wheels, while the driving force is generated in another of the left and right follower wheels in which no braking force is generated, wherein the values of said driving force and braking force are increased in accordance with an increase in lateral acceleration of the vehicle when no longitudinal acceleration of the vehicle is generated.

3. The process for controlling a yaw moment in a vehicle according to claim 1, wherein the step of generating the braking force comprises the steps of generating the braking force in said one of said left and right wheels, and generating the driving force in said another of the left and right wheels in which no braking force is generated by connecting the left and right wheels through a gear box to generate differential rotations.

4. The process for controlling a yaw moment in a vehicle according to claim 3, wherein said left and right wheels are follower wheels.

5. The process for controlling a yaw moment in a vehicle according to claim 2, wherein the step of generating the driving force in said another of the left and right follower wheels in which no braking force is generated is performed by connecting the follower wheels through a gear box to generate differential rotations.

* * * * *